Feb. 14, 1967   J. LIEL   3,303,636
CLEANING ARRANGEMENT FOR FILTER TUBES
Filed July 16, 1963   2 Sheets-Sheet 1
FIG. 1
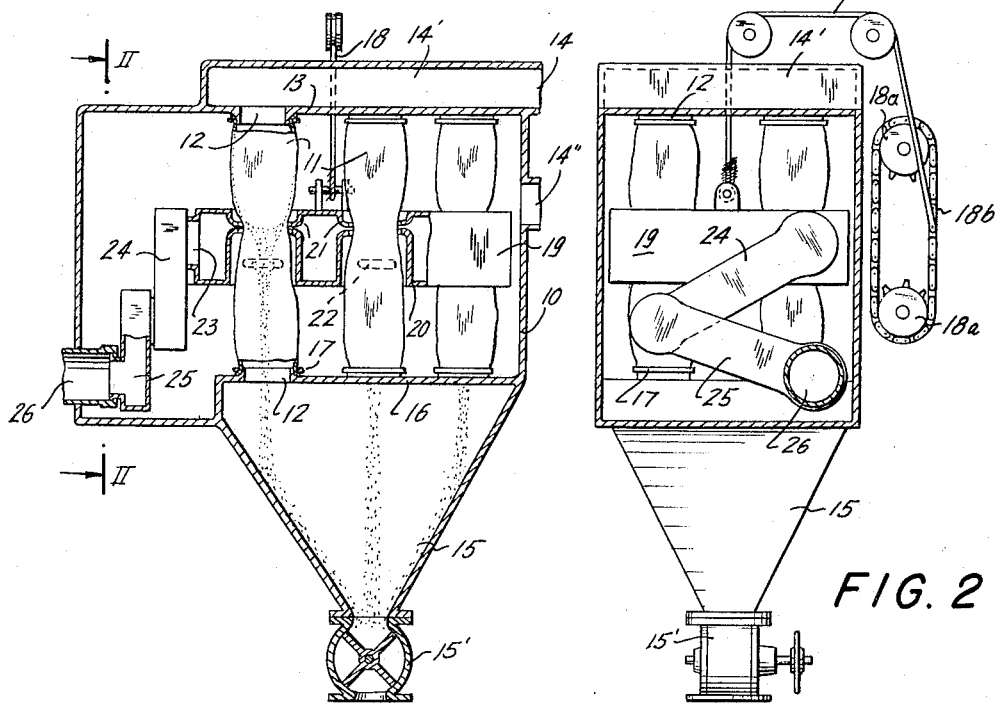
FIG. 2
FIG. 4
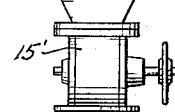
FIG. 3
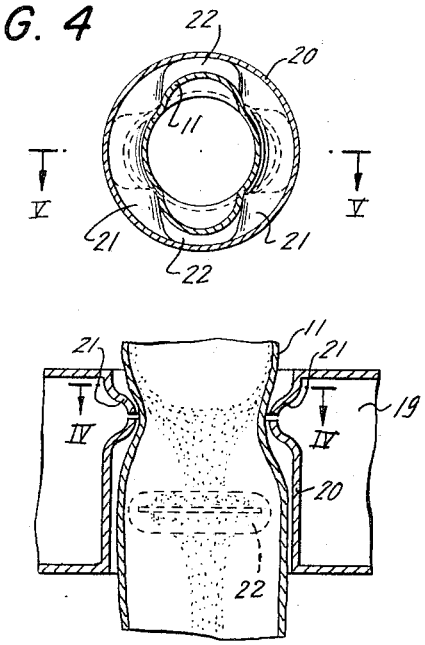
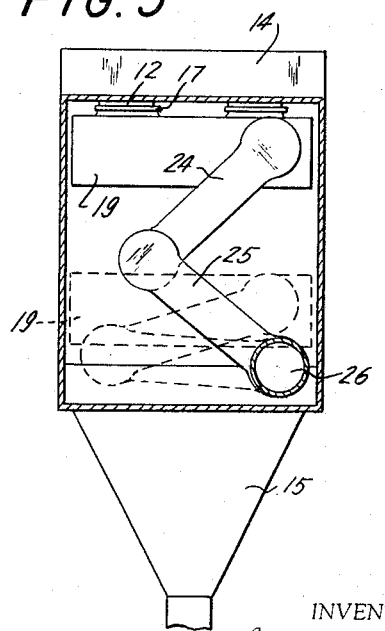
FIG. 5
INVENTOR.
Johannes Liel
BY
Michael J. Striker Feb. 14, 1967  J. LIEL  3,303,636
CLEANING ARRANGEMENT FOR FILTER TUBES
Filed July 16, 1963  2 Sheets-Sheet 2

INVENTOR.
Johannes Liel
BY
Michael S. Striker

United States Patent Office 3,303,636
Patented Feb. 14, 1967

3,303,636
CLEANING ARRANGEMENT FOR FILTER TUBES
Johannes Liel, Munster, Westphalia, Germany, assignor to Standard Filterbau-Gesellschaft m.b.H., Munster, Westphalia, Germany
Filed July 16, 1963, Ser. No. 295,411
Claims priority, application Germany, July 16, 1962, St 19,487
1 Claim. (Cl. 55—294)

The present invention relates to a cleaning arrangement for filter tubes, and more particularly to apparatus for removing dust from the inner surfaces of filter tubes in a cleaning operation, and by means of air blown into the interior of the filter tubes through the walls of the same.

Apparatus serving this purpose is known, and it is one object of the present invention to improve known cleaning apparatus for filter tubes, and to provide a cleaning arrangement of simple construction which will reliably clean filter tubes and remove dust from the inner surface of the same.

Another object of the invention is to provide a cleaning arrangement for filter tubes requiring comparatively low pressure of the cleaning fluid.

Another object of the invention is to provide a cleaning arrangement in which the cleaning fluid moves at high speed through the walls of the filter tubes.

Another object of the invention is to provide a cleaning arrangement for filter tubes in which impurities contained in the cleaning air are not permitted to pass to the nozzles through which the cleaning fluid is blown so that the filter tubes are protected from the abrasive impact of such impurities which may contain abrasive particles which may damage the filter tube, particularly if retained by the nozzles which move along the filter tubes.

With these objects in view, the present invention relates to a cleaning arrangement for filter tubes, particularly of the type serving as dust filters. One embodiment of the invention comprises container means having nozzle means and being movable in longitudinal direction of the filter tube so that consecutive sections of the filter tube are engaged by the nozzle means, and supply means for supplying a fluid into the container means so that the fluid passes through the nozzle means into the filter tube for displacing deposits from the inner surface of the same.

In accordance with the invention, the nozzle means project inwardly from a tubular wall of the container means which surrounds each filter tube a small distance spaced from the same. The inwardly projecting nozzle means are disposed to deform the filter tube so that during the up and down movement of the container means along the filter tubes, each filter tube is deformed on consecutive axial sections, while air is blown by the nozzles into the same.

In the preferred embodiment of the invention, a plurality of nozzle means is spaced along the length of each filter tube, and each nozzle means includes a pair of opposite nozzles, the pairs being staggered around the circumference of the filter tube.

It is particularly advantageous to arrange two pairs of nozzles angularly spaced around the filter tube an angle of 180°, and provide in each nozzle a slot of at least 90° circumferential extension, so that the entire circumference of the filter tube is surrounded by nozzle slots which, however, are located in pairs in two different planes perpendicular to the axis of the filter tube.

The filter tube is constricted from opposite sides in each of the two planes by the nozzles, but the pairs of nozzles are spaced such a distance from each other that the filter tube assumes and retains its normal circular cross-sectional shape between the pairs of nozzles. Since the container with the nozzle means moves up and down along the filter tubes, it is necessary to provide inlet means which are adapted to follow such movement. In accordance with one embodiment of the invention, scissor-like inlet tubes connect the container means with a stationary inlet, so that the cleaning fluid, which is preferably air, is supplied to the container in all positions of the same.

According to another embodiment of the invention, the container has an inlet tube of oblong cross-section which passes through a pair of resilient sealing means extending in direction of the movement of the container. The sealing means form a wall of an inlet chamber in which impurities and foreign bodies contained in the cleaning air may gather before entering the container.

For the same purpose, the lower nozzle means is spaced from the bottom wall of the container, so that impurities of the cleaning air can accumulate on the bottom wall instead of being blow through the lower nozzle means.

The novel features which are considered as characteristic for the invention are set forth in particular in the appended claim. The invention itself, however, both as to its construction and its method of operation, together with additional objects and advantages thereof, will be best understood from the following description of specific embodiments, when read in connection with accompanying drawings, in which:

FIG. 1 is a vertical sectional view illustrating one embodiment of the invention;

FIG. 2 is a vertical sectional view taken on line II—II in FIG. 1;

FIG. 3 is a vertical sectional view corresponding to FIG. 2 but illustrating another operational position, certain elements being omitted in FIG. 3 for the sake of simplicity;

FIG. 4 is a horizontal sectional view taken on line IV—IV in FIG. 5 and illustrating on an enlarged scale a filter tube deformed by nozzle means;

FIG. 5 is a vertical sectional view taken on line V—V in FIG. 4;

Figure 6:
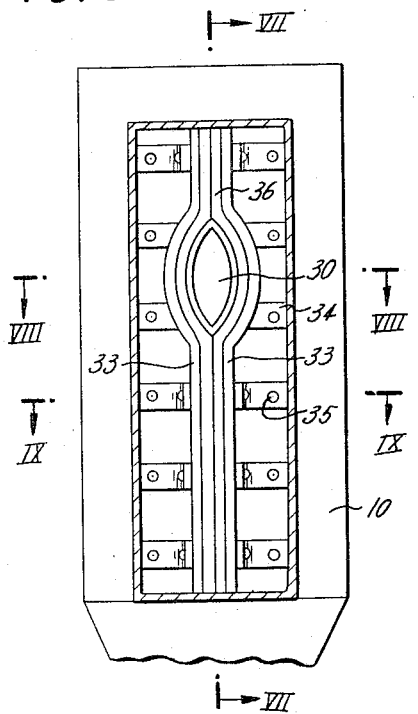
FIG. 6 is a vertical sectional view taken on line VI—VI in FIG. 7 and illustrating another embodiment of the invention.
Figure 7:
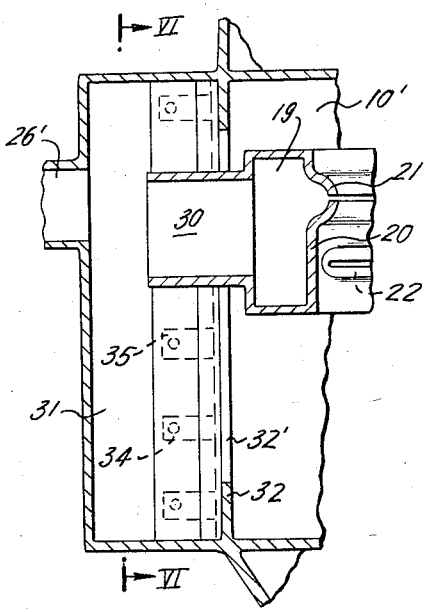
FIG. 7 is a vertical sectional view taken on line VII—VII in FIG. 6.
Figure 8:
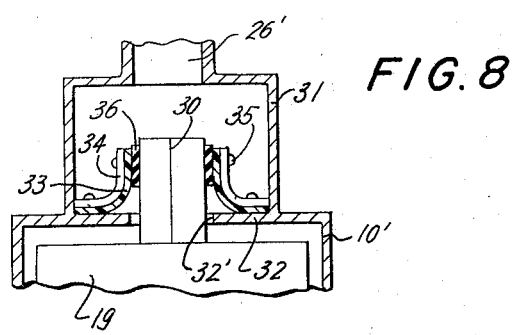
FIG. 8 is a fragmentary horizontal sectional view taken on line VIII—VIII in FIGS. 6 and 7.
Figure 9:
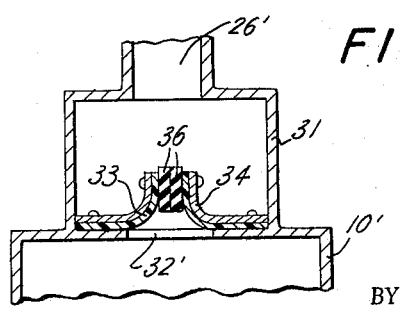
FIG. 9 is a fragmentary horizontal sectional view taken on line IX—IX in FIG. 6.

Referring now to the drawings, and more particularly to FIGS. 1 to 5, a dust filter apparatus has a housing 10 in which vertical filter tubes 11 are mounted on flanges 12 of an upper wall 13 and a lower wall 11 by means of clamping rings 17. Dusty air enters through the inlet 14 of the inlet chamber 14' and is distributed to the filter tubes 11 of which six are provided in the illustrated embodiment. The air passes transversely through the walls of the filter tubes 11 into the interior of the housing 10 and is discharged through the outlet 14". In this manner, accumulations of dust are deposited on the inner surface of filter tubes 11.

Cleaning means are provided for removing dust accumulations from the filter tubes, and include a flat container means 19 which has a substantially smaller height than the housing 10 of the filter apparatus. The container means 19 has tubular walls between its top and bottom walls, and each tubular wall 20 surrounds one of the filter tubes 11 slightly spaced from the same.

Two nozzle means 21 and 22 are provided in each tubular wall 20. Each nozzle means 21 and 22 includes a pair of oppositely arranged nozzles, as best seen in FIGS. 4 and 5. The nozzles project inwardly to deform the respective section of the filter tube 11. The pairs of nozzles 21 and 22 are angularly spaced an angle of 180°, and each nozzle extends substantially along a chord of the tubular wall 20. However, each nozzle is concave in the region of a part-circular nozzle slot thereof so that the filter tube 11 is deformed by each pair of nozzles, as shown in solid lines for the pair of nozzles 21, and in broken lines for the pair of nozzles 22. The filter tube section engaged by the respective pair of nozzles is constricted in one horizontal direction, and expanded in the other horizontal direction, but the pairs of nozzles 21 and 22 are spaced from each other in the longitudinal direction of the filter tube 11 so that the same can assume its normal circular shape between the pairs of nozzles 21 and 22. The tube engaging nozzle portions extend through angles greater than 90° in the embodiment illustrated in the drawing, in which two pairs of nozzles are provided. Consequently, all four nozzles extend around the entire circumference of the filter tube so that during the up and down movement of the container 19 with nozzles 21 and 22, the entire outer surface of each filter tube is deformed and penetrated by cleaning air passing through the part-circular nozzle slots of nozzles 21 and 22.

The up and down movement of container 19 in housing 10 is accomplished by rope means 18 secured to container 19 and being guided over pulleys which are mounted on two stationary shafts. The end of the rope means 18 is secured to a chain 18b guided over a pair of pulleys 18a of which one is driven so that the container 19 is moved up and down a distance determined by the spacing between the pulleys 18a, which distance corresponds to the inner height of the housing 10 which limits movement of container 19.

Container 19 has an inlet tube 23 on which a connecting tube is pivotally mounted. The other end of connecting tube 24 is pivotally connected to another connecting tube 25 which is turnable in a stationary inlet tube passing through the wall of housing 10. The connecting tubes 24 and 25 are thus connected in such a manner that they are free to perform a scissor-like movement when container 19 is moved up and down, and since connecting tubes 24 and 25 communicate in all angular positions with the stationary inlet tube 26 and with the moving inlet tube 23 of container 19, cleaning fluid, such as air, can be supplied from inlet 26 into container 19 during movement of the same, and passes through the nozzle means 21 and 22 into the filter tubes 11.

As explained above, consecutive filter tube sections are engaged and deformed by the nozzles 21 and 22 during up and down movement of container 19, so that the dust or other accumulations deposited on the inner surface of the filter tubes 11, are removed by the combined action of the inwardly flowing cleaning air, and the deforming action of the inwardly projecting pairs of nozzles 21 and 22.

The deformation of the filter tube walls by nozzles 21 and 22 has not only a mechanical effect aiding the removal of the dust deposits, but also causes a more airtight engagement between the nozzles 21 and 22 and the outer surface of the filter tubes 11, since the constricted and deformed wall sections of the filter tubes tend to assume the shape of the nozzles and thereby seal the lips of the nozzle slots.

As best seen in FIG. 4, the deformation of the filter tube between each pair of nozzles expands the filter tube in a direction transverse to the compressing action of the pair of nozzles, but the spacing between opposite nozzles is selected so that the expanded wall portions of the filter tube do not touch the inner surface of the tubular wall 20 on which the nozzles are provided.

In this manner, scraping of the outer surface of the filter tube by the inner surface of walls 20 is avoided, and the filter tube is slidably engaged only by the nozzles which are constructed and designed for this purpose so as to cause no abrasions on the outer surface of the filter tubes.

It is unavoidable that the cleaning air contains impurities, and small particles which may have sharp edges. In order to avoid that such impurities are blown forcefully against the outer surface of the tubes, or clog the nozzles, the lower nozzles 22 are not provided directly adjacent the bottom wall of container 19 but somewhat spaced from the same, as best seen in FIG. 5. On the other hand, the upper nozzles 21 are provided closely spaced from the top wall of container 19.

Any impurities contained in the cleaning air and entering through the inlet tube 23 into container 19, will be deposited on the bottom wall of container 19, and will not pass into the lower nozzle means 22.

The dust displaced by the action of the cleaning air from the inner surfaces of filter tubes 11 drops into a downwardly tapering receiving container 15 from where it is removed through an outlet provided at the bottom thereof.

This removal is effected continuously by means of a rotary valve gate.

In the highest position of container 19 illustrated in FIG. 3, the upper pair of nozzles 21 is located closely adjacent the upper wall 13 of housing 10.

As far as container 19, tubular container walls 20 and pairs of nozzles 21 and 22 are concerned, the embodiment of FIGS. 6 to 9 corresponds fully to the embodiment of FIGS. 1 to 5, and consequently corresponding parts are indicated by the same reference numerals. The housing 10' of the filter apparatus is extended by an inlet chamber 31 which has an inlet 26' for the cleaning air. The wall intermediate the inlet chamber 31 and the housing 10' has a vertical slot 32' through which an inlet tube 30 of container 19 passes. The cross section of inlet tube 30 is lens-shaped, as best seen in FIG. 6, and oblong in vertical direction, which corresponds to the longitudinal direction of filter tubes and to the direction of the up and down movement of container 19.

Slot 32' is normally closed by sealing means which include a pair of sealing strips, each of which includes a flexible resilient band 33, and thin resilient steel band 34 and rivets which secure bands 33, 34 to a pair of rubber strips 36. The two sealing strips are secured by rivets to wall 32 on opposite sides of slot 32', and are constructed in such a manner that the rubber strips 36 tend to engage each other to provide a seal between inlet chamber 31 and the interior of container means 19. Cleaning air entering through inlet 26' into the inlet chamber 31 will press the sealing strips against each other, and the steel bands 34 are provided for the purpose of preventing the bending of the sealing strips to a position located in slot 32'. The rubber strips 36 fully cover the heads of the rivets which secure steel bands 34 to the flexible resilient material of the sealing bands 33.

The resiliency of the sealing strips is such that they abut each other, and also the outer surface of the inlet tube 30 in sealing engagement, as is best seen in FIG. 6. When container 19 is moved up and down in housing 10' in a manner described with reference to FIG. 2, inlet tube 30 will move between the sealing strips 36 while inlet chamber 31 is fully sealed and separated from the interior of the housing 10'.

The inlet arrangement of the embodiment of FIGS. 6 to 9 assures the supply of cleaning air to container 19 in each vertically displaced position of the container, and has the additional advantage that impurities contained in the cleaning air will accumulate in the inlet chamber 31, and will not enter container 19. In this manner, any abrasive impact of impurities on the filter tubes, and clogging of the nozzles is prevented.

It will be understood that each of the elements described above, or two or more together, may also find a useful application in other types of cleaning arrangements for filters differing from the types described above.

While the invention has been illustrated and described as embodied in a cleaning apparatus for dust filter tubes including angularly displaced pairs of nozzles positioned to deform the filter tubes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A cleaning arrangement for a plurality of parallel filter tubes which extend in vertical direction, comprising, in combination, a container having a horizontal top wall and a horizontal bottom wall spaced in said vertical direction a distance less than the length of the filter tubes, said container including a plurality of tubular walls extending between said top and bottom walls and respectively surrounding the filter tubes spaced from the same, each tubular wall having two inwardly projecting higher and lower nozzle means, each nozzle means including a pair of opposite nozzles angularly displaced relative to the respective other nozzle means an angle of 180° and adapted to engage and to deform spaced sections of the respective surrounded filter tube, each of said nozzles extending substantially along a chord of said tubular wall and having a part-circular concave edge formed with an outlet slot extending in a horizontal direction through an angle of substantially 90°, each pair of nozzles being adapted to constrict the respective filter tube section in one horizontal direction and to cause expansion of the respective filter tube section in a transverse horizontal direction, said pairs of nozzles being spaced in vertical direction along the length of the respective filter tube such a distance that the same remains undeformed between said deformed sections thereof;

means for moving said container in said vertical direction so that consecutive sections of the filter tubes are deformed by said nozzle means;

and means for supplying a fluid to the interior of said container so that fluid passes through said nozzle means and through the walls into the filter tubes for displacing deposits from the inner surfaces of the filter tubes.

References Cited by the Examiner

UNITED STATES PATENTS

| | | | |
|---|---|---|---|
| 2,495,635 | 1/1950 | Hersey | 55—294 X |
| 2,496,209 | 1/1950 | Hemming. | |
| 2,511,817 | 6/1950 | Sheldon | 55—294 |
| 2,751,042 | 6/1956 | Sylvan | 55—294 |
| 2,861,649 | 11/1958 | Junkmann | 55—294 |
| 2,885,028 | 5/1959 | Sylvan | 55—294 X |
| 3,126,913 | 3/1964 | Green et al. | 137—615 |
| 3,173,776 | 3/1965 | Palmore | 55—294 |

W. B. KNIGHT, *Primary Examiner.*

ROBERT F. BURNETT, *Examiner.*

D. K. DENENBERG, *Assistant Examiner,*